(12) United States Patent
Kurian et al.

(10) Patent No.: US 11,743,714 B2
(45) Date of Patent: Aug. 29, 2023

(54) MECHANISMS FOR SERVICE RECOVERY IN NEIGHBOR AWARENESS NETWORK (NAN)

(71) Applicant: Apple Inc., Cupertino, CA (US)

(72) Inventors: Lawrie Kurian, San Jose, CA (US); Archish Y. Rangan, Milpitas, CA (US); Manav Gabhawala, San Francisco, CA (US); Prasad Vasantha Gopinathan, San Jose, CA (US); Tashbeeb Haque, San Francisco, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 17/497,527

(22) Filed: Oct. 8, 2021

(65) Prior Publication Data

US 2022/0116767 A1 Apr. 14, 2022

Related U.S. Application Data

(60) Provisional application No. 63/089,741, filed on Oct. 9, 2020.

(51) Int. Cl.
| | |
|---|---|
| *H04W 8/30* | (2009.01) |
| *H04W 40/24* | (2009.01) |
| *H04W 40/30* | (2009.01) |
| *H04L 67/55* | (2022.01) |

(52) U.S. Cl.
CPC ............... *H04W 8/30* (2013.01); *H04L 67/55* (2022.05); *H04W 40/248* (2013.01); *H04W 40/30* (2013.01)

(58) Field of Classification Search
None
See application file for complete search history.

(56) References Cited

U.S. PATENT DOCUMENTS

| | | | | |
|---|---|---|---|---|
| 2014/0302787 | A1* | 10/2014 | Rantala | H04W 8/005 455/41.2 |
| 2016/0014669 | A1* | 1/2016 | Patil | H04W 76/11 370/329 |
| 2016/0353233 | A1* | 12/2016 | Yong | H04L 67/51 |
| 2016/0374107 | A1* | 12/2016 | Das | H04L 65/611 |
| 2017/0026282 | A1* | 1/2017 | Huang | H04W 8/005 |
| 2017/0208559 | A1* | 7/2017 | Tamura | H04W 56/0015 |

(Continued)

*Primary Examiner* — Kenny S Lin
(74) *Attorney, Agent, or Firm* — Sterne, Kessler, Goldstein & Fox P.L.L.C.

(57) ABSTRACT

Some aspects of this disclosure relate to apparatuses and methods for implementing wireless devices. A service is provided by a first application operating on a publisher device to a second application operating on a subscriber device over a first data path between the two devices in a NAN network. The publisher device includes a first recovery manager to receive an indication from a wireless controller of the publisher device or a distress message from a second recovery manager of the subscriber device. The received indication or distress message indicates that the first data path has been interrupted. The first recovery manager stores, in a memory, data generated by the first application. A second data path is established between the publisher device and the subscriber device. The first recovery manager sends the stored data to the second application that operates on a subscriber device.

20 Claims, 8 Drawing Sheets

(56) References Cited

U.S. PATENT DOCUMENTS

2018/0027601 A1* 1/2018 Hamachi ............... H04W 76/14
                                                      370/254
2019/0014610 A1* 1/2019 Liu ....................... H04W 8/005

* cited by examiner

MECHANISMS FOR SERVICE RECOVERY IN NEIGHBOR AWARENESS NETWORK (NAN)

RELATED APPLICATION

This application claims benefit to U.S. Provisional Application No. 63/089,741, filed Oct. 9, 2020, which is incorporated herein by reference.

BACKGROUND

Field

The described aspects generally relate to managing service recovery in neighbor awareness network (NAN).

Related Art

In a wireless communication or computer network, a wireless device, e.g., a user equipment (UE), can communicate with a base station or an access point (AP), where the AP is typically communicatively coupled to the Internet. A wireless local area network (WLAN) is a wireless network that links two or more wireless devices using wireless communication to form a local area network (LAN) within a limited area such as a home, school, computer laboratory, campus, or office building. Some WLAN is based on IEEE 802.11 standards and is marketed under the Wi-Fi name. A neighbor awareness network (NAN) is a peer-to-peer direct wireless communication network formed between neighboring wireless devices. A NAN network can be associated with a WLAN technology, e.g., Wi-Fi technology, and therefore referred to as Wi-Fi Aware. However, there are still many issues unresolved in NAN networks.

SUMMARY

Some aspects of this disclosure relate to apparatuses and methods for implementing neighbor awareness network (NAN), which is a peer-to-peer direct communication network formed between neighboring wireless devices. A NAN network can be built at least partially utilizing wireless local area network (WLAN) technology, e.g., Wi-Fi technology. A NAN network and a NAN are used interchangeably in this disclosure. A data path can be established between a publisher device and a subscriber device of a NAN network. A service can be provided over the data path by an application operating on the publisher device to another application operating on the subscriber device. The data path between the publisher device and the subscriber device can be interrupted for various reasons, e.g., a power down or reset of a wireless controller that manages the wireless communication between the two devices. When the data path is interrupted, embodiments herein provide mechanisms to enable the service to be provided without interruption over a new data path.

Some aspects of this disclosure relate to a wireless device. The wireless device can function as a subscriber device in a NAN network. The wireless device includes a transceiver configured to wirelessly communicate with a publisher device in the NAN network. The wireless device further includes a wireless controller communicatively coupled to the transceiver to manage communications between the publisher device and the subscriber device. The wireless device also includes a first application, and a processor communicatively coupled to the transceiver and the wireless controller, where the first application is operated by the processor. A first data path is established between the subscriber device and the publisher device. The first data path has a first data path identifier. A service is provided through the first data path by a second application that operates on the publisher device to the first application that operates on the subscriber device. The provided service is identified by a first identifier to identify the first application, and a second identifier to identify the second application. The service is provided using an interface address, a NAN Data Interface (NDI) address, and an Internet Protocol (IP) address over the first data path with the first data path identifier.

According to some aspects, a first recovery manager operates in connection with the wireless controller, and is configured to receive an indication from the wireless controller that the wireless controller has been reset, and the first data path between the subscriber device and the publisher device has been interrupted. The first recovery manager is further configured to send, to a second recovery manager that operates on the publisher device, a distress message to request the service provided through the first data path to be without interruption, where the distress message includes the first identifier to identify the first application. In addition, the first recovery manager is configured to subscribe the first application to receive the service provided by the second application that operates on the publisher device, and initiate a second data path between the subscriber device and the publisher device to replace the first data path to provide the service. Furthermore, the first recovery manager is configured to establish the second data path. The second data path has a second data path identifier that is the same as the first data path identifier of the first data path. Afterwards, the first recovery manager is configured to send to the second recovery manager a third identifier to identify the first application that operates on the subscriber device to receive the service from the second application through the second data path. The first identifier to identify the first application for the service provided through the first data path, the second identifier to identify the second application for the service provided through the first data path, or the third identifier to identify the first application for the service provided through the second data path is a universally unique identifier (UUID) including a 128-bit number.

According to some aspects, after the second data path has been established, the first application is configured to receive data from the second application through the second data path. The data is stored by the second recovery manager and generated by the second application during a time period from a time instance when the wireless controller has been reset to a time instance when the publisher device has received the third identifier to identify the first application that operates on the subscriber device to receive the service through the second data path. The first application further receives data through the second data path from the second application, where the data is generated by the second application to continue to provide the service after the publisher device has received the third identifier. The service is provided by the second application through the second data path using an interface address, a NAN Data Interface (NDI) address, and an Internet Protocol (IP) address that have been used by the service provided through the first data path.

According to some aspects, the first data path between the subscriber device and the publisher device can be interrupted by problems caused in the publisher device. In such events, the first recovery manager is configured to receive, from the second recovery manager that operates on the publisher device, a distress message to indicate that the first data path between the subscriber device and the publisher device has been interrupted, and that a service provided through the first data path is without interruption. The service is provided by the second application that operates on the publisher device to the first application that operates on the subscriber device. The service provided through the first data path is identified by the first identifier to identify the first application, and the second identifier to identify the second application. The distress message includes the second identifier to identify the second application to the subscriber device. Furthermore, the first recovery manager is configured to initiate a second data path between the subscriber device and the publisher device to replace the first data path to provide the service, and establish the second data path between the subscriber device and the publisher device to replace the first data path to provide the service. In addition, the first recovery manager is configured to receive from the publisher device a third identifier to identify the second application that operates on the publisher device to provide the service to the first application through the second data path.

According to some aspects, after the second data path has been established, the first application is configured to receive data from the second application through the second data path. The data is stored by the second recovery manager and generated by the second application during a time period from a time instance when the first data path has been interrupted to a time instance when the subscriber device has received the third identifier to identify the second application that operates on the publisher device to provide the service through the second data path. In addition, the first application is configured to receive data from the second application through the second data path, where the data is generated by the second application after the subscriber device has received the third identifier.

Some aspects of this disclosure relate to a wireless device that functions as a publisher device in a NAN network. The following descriptions are from the perspective of the publisher device. The wireless device includes a transceiver configured to wirelessly communicate with a subscriber device in the NAN network. The wireless device further includes a wireless controller communicatively coupled to the transceiver to manage communications between the publisher device and the subscriber device. The wireless device also includes a first application, and a processor communicatively coupled to the transceiver and the wireless controller, where the first application is operated by the processor. A first data path is established between the subscriber device and the publisher device. The first data path has a first data path identifier. A service is provided through the first data path by the first application that operates on the publisher device to the second application that operates on the subscriber device. The provided service is identified by a first identifier to identify the first application, and a second identifier to identify the second application.

According to some aspects, a first recovery manager operates in connection with the wireless controller, and is configured to receive an indication from the wireless controller that the wireless controller has been reset, and the first data path between the subscriber device and the publisher device has been interrupted. The first recovery manager is further configured to store, in a memory communicatively coupled to the wireless controller, data generated by the first application that operates on the publisher device so that the service provided by the first application through the first data path to the second application that operates on the subscriber device is without interruption. In addition, the first recovery manager is configured to publish the service provided by the first application, and send a distress message to a second recovery manager that operates on the subscriber device to indicate that the first data path has been interrupted, where the distress message includes the first identifier. Afterward, the first recovery manager is configured to establish a second data path between the subscriber device and the publisher device to replace the first data path to provide the service, and send to the second recovery manager a third identifier to identify the first application to provide the service to the second application through the second data path. Furthermore, the first recovery manager is configured to send, through the second data path, data stored in the memory and generated by the first application. The data is generated by the first application during a time period from a time instance when the wireless controller has been reset to a time instance when the subscriber device has received the third identifier to identify the first application to provide the service through the second data path. In addition, the first application provides data through the second data path to the second application, where the data is generated by the first application to continue to provide the service after the subscriber device has received the third identifier.

According to some aspects, the first data path between the subscriber device and the publisher device can be interrupted by problems caused in the subscriber device. In such events, the first recovery manager is configured to receive, from the second recovery manager that operates on the subscriber device, a distress message to indicate that the first data path between the subscriber device and the publisher device has been interrupted, and that the service provided through the first data path is without interruption. The service is provided through the first data path by the first application that operates on the publisher device to the second application that operates on the subscriber device. The provided service is identified by a first identifier to identify the first application, and a second identifier to identify the second application. The distress message includes the second identifier.

Moreover, the first recovery manager is configured to validate the second application based on the second identifier received in the distress message. The first recovery manager is further configured to store, in a memory communicatively coupled to the wireless controller, data generated by the first application so that a service provided by the first application is without interruption.

In addition, the first recovery manager is further configured to establish a second data path between the subscriber device and the publisher device to replace the first data path to provide the service, and receive from the subscriber device a third identifier to identify the second application to receive the service through the second data path. Afterwards, the first recovery manager is further configured to send, through the second data path, data stored in the memory and generated by the first application. The data is generated by the first application during a time period from a time instance when the first data path has been interrupted to a time instance when the publisher device has received the third identifier to identify the second application to receive the service through the second data path. The first application further provides data through the second data path to the second application, where the data is generated by the first application to continue to provide the service after the publisher device has received the third identifier.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
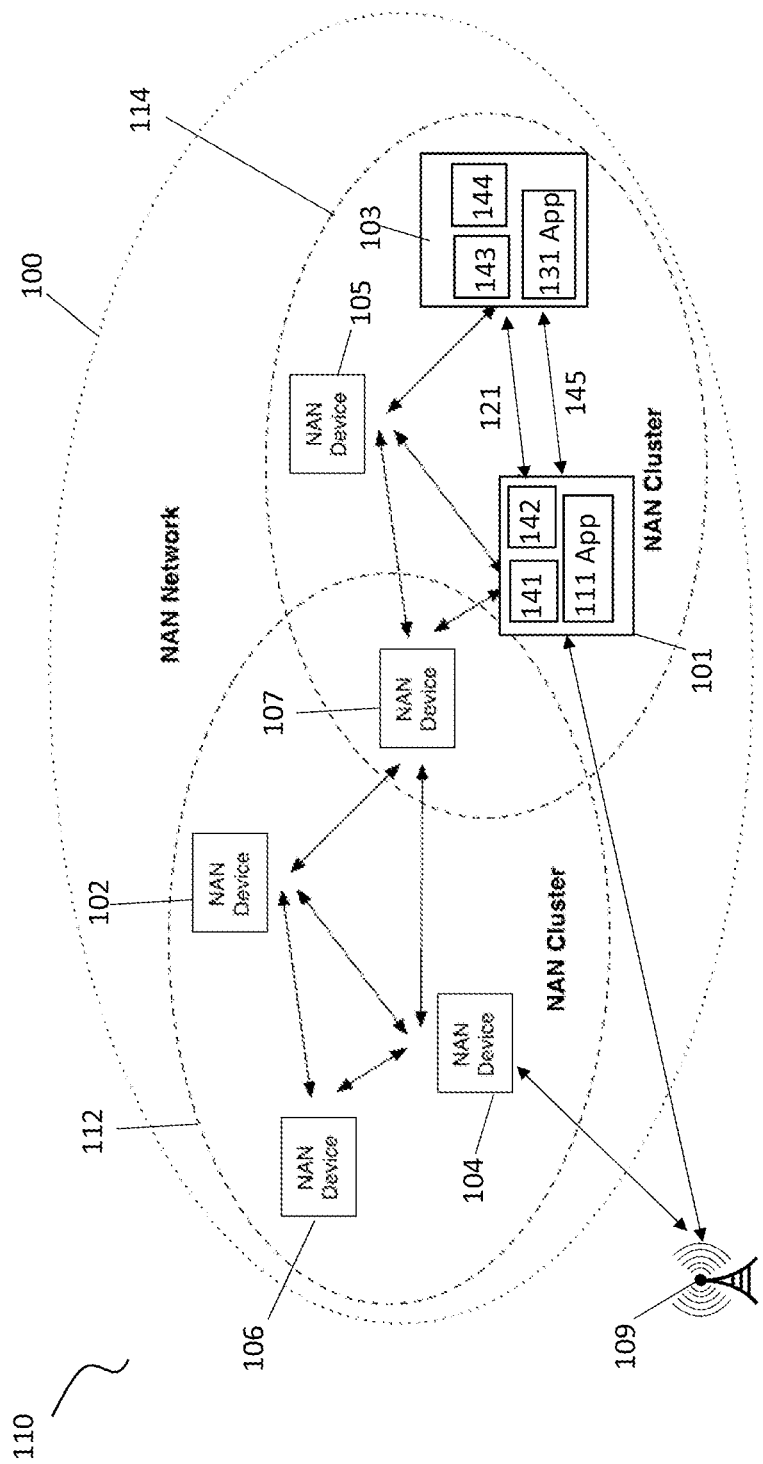
FIGS. 1A-1B illustrate wireless devices in an example neighbor awareness network (NAN) implementing recovery managers for providing a service without interruption between two devices of the NAN when a data path between the two devices has been interrupted, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless communication or computer network, a wireless device, e.g., a user equipment (UE), can communicate with a base station or an access point (AP), where the AP is typically communicatively coupled to the Internet. For example, an AP and a set of wireless devices can form a wireless local area network (WLAN) within a limited area such as a home, school, computer laboratory, campus, or office building. Some WLAN is based on IEEE 802.11 standards and is marketed under the Wi-Fi name. A neighbor awareness network (NAN) is a peer-to-peer direct wireless communication network formed between neighboring wireless devices. For example, a set of wireless devices within a WLAN can form a NAN network. A NAN network formed over an IEEE 802.11 WLAN can be referred to as Wi-Fi Aware network as well. In this disclosure, a wireless device can be simply referred to as a device, or referred by the function it performs, e.g., a subscriber device, or a publisher device.

In a NAN network, a service can be provided by a first application operating on a publisher device to a second application operating on a subscriber device of the NAN, where the publisher device and the subscriber device are communicatively coupled by a first data path. The first data path between the publisher device and the subscriber device can be interrupted for various reasons, e.g., a power down or reset of a wireless controller that manages the wireless communication between the two devices. For example, a wireless controller in a wireless device of a NAN network can be reset due to software or hardware glitches or bugs, invalid commands from a host, low memory conditions, or other causes. Once the wireless controller in the wireless device is reset, the wireless device can loose all the states and data related to the service provided over the first data path by the first application operating on the publisher device to the second application operating on the subscriber device. In order to restart the service, according to some mechanism, the first application and the second application have to restart the service discovery and re-establish a second data path without any information available about the service before the first data path is interrupted. Such an approach is inefficient. In addition, data generated by the first application operating on the publisher device can be lost before the second data path is established and the service is restarted.

Some aspects of this disclosure provide mechanisms to avoid interruptions to the service provided by the first application operating on the publisher device to the second application operating on the subscriber device. A second data path can be established after the first data path has been interrupted. The data generated by the first application to be provided to the second application can be saved in a memory before the second data path is established between the two devices. The detailed operations are managed by a first recovery manager operated on the publisher device, and a second recovery manager operated on the subscriber device. A distress message can be sent from the first recovery manager to the second recovery manager when there is an interruption to the data path caused by the publisher device. Similarly, a distress message can be sent from the second recovery manager to the first recovery manager when there is an interruption to the data path caused by the subscriber device. The first recovery manager further stores data generated by the first application that operates on the publisher device so that the service provided by the first application would not lose data when the first data path is interrupted. The first recovery manager and the second recovery manager further work to establish a second data path to replace the first data path. After the second data path is established, the first recovery manager sends to the second application, through the second data path, data stored in the memory that generated by the first application. In this way, the second application can receive all data provided by the first application even if the first data path has been interrupted. In addition, the service provided through the second data path can use an interface address, e.g. a NAN Data Interface (NDI) address, and an Internet Protocol (IP) address that have been used by the service provided through the first data path. Therefore, at least part of the service discovery and establishment can be saved.

Figure 1B:
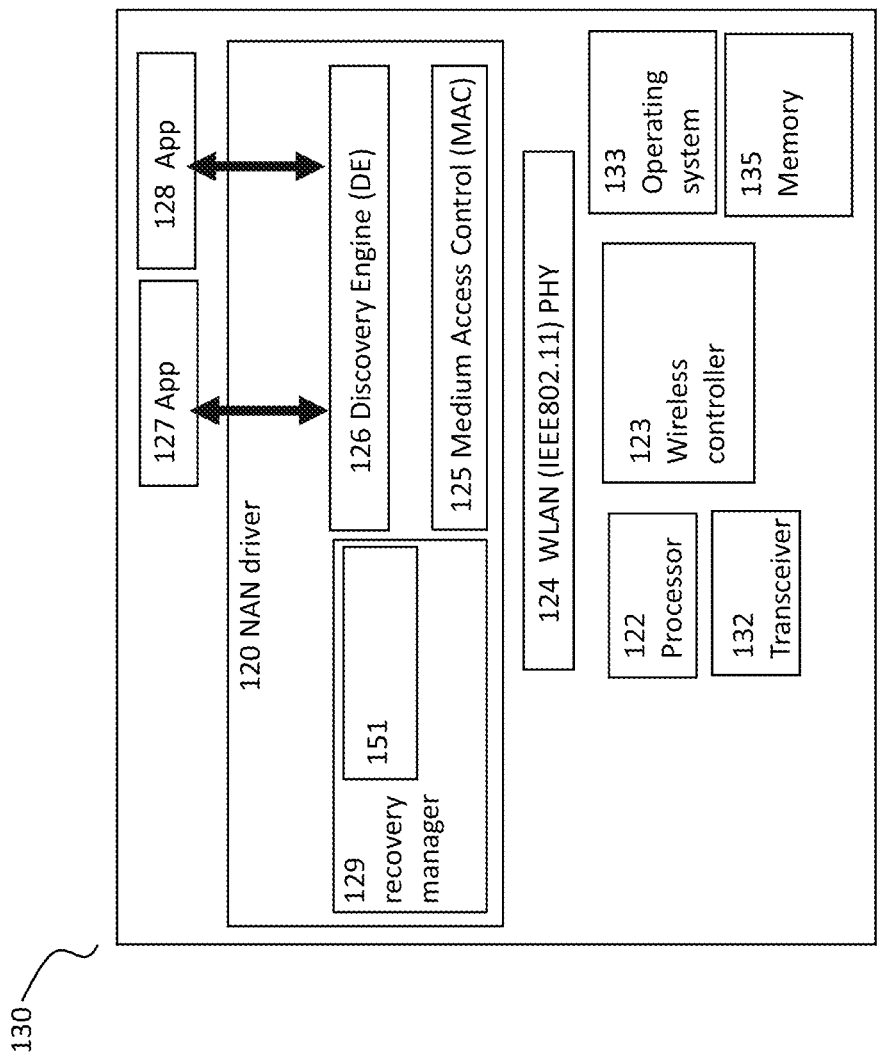

FIGS. 1A-1B illustrate wireless devices in an example neighbor awareness network (NAN) network 100 implementing recovery managers for providing a service without interruption between two devices when a data path between the two devices has been interrupted, according to some aspects of the disclosure. The NAN network 100 is provided for the purpose of illustration only and does not limit the disclosed aspects. The NAN network 100 can include, but is not limited to, multiple wireless devices, e.g., a wireless device 101, a wireless device 102, a wireless device 103, a wireless device 104, a wireless device 105, a wireless device 106, and a wireless device 107. In addition, the wireless devices 101-107 are also within a wireless local area network (WLAN) system 110, which further includes an access point (AP) 109.

According to some aspects, the WLAN system 110 includes the AP 109 and the wireless devices 101-107. The wireless devices 101-107 can communicate over a wireless communication channel with the AP 109. The AP 109 can communicate via a wired or wireless communication channel with one or more other electronic devices (not shown) and/or another network, such as the Internet. The WLAN system 110 can be configured to operate according to any of various communications standards, such as the various IEEE 802.11 standards or protocols, e.g., 802.11a, b, g, n, ac, and ax. The AP 109 can be a Wi-Fi access point, or additionally or alternatively, be configured to communicate via various other wireless communication technologies, including, but not limited to, a wireless communication system based on 3rd Generation Partnership Project (3GPP) release 16 (Rel-16), release 17 (Rel-17), a New Radio (NR) wireless systems, or any other wireless technology. The AP 109 can communicate over a 2.4 GHz band, a 5 GHz band, an mmWave band, a S1G band, and/or any other band.

According to some aspects, the wireless devices 101-107 can be a mobile phone, a cellular telephone, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, a mobile or portable Global Positioning System (GPS) device, a digital video broadcast (DVB) device, a sensor device, an on-board device, an off-board device, a consumer device, a vehicular device, a video device, an audio device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a digital video camera (DVC), a digital audio player, a speaker, an audio receiver, an audio amplifier, a gaming device, a media player, or the like.

According to some aspects, the wireless devices 101-107 can communicate directly with each other without use of the AP 109 to form a peer-to-peer network, e.g., the NAN network 100. In some examples, the NAN network 100 can be referred to as a WiFi aware network including NAN devices that share a set of common NAN parameters. For example, the wireless devices 101-107 can share a same time duration of the discovery windows.

According to some aspects, the NAN network 100 includes a cluster 112 and a cluster 114. The cluster 112 includes the devices 102, 104, 106, and 107, while the cluster 114 includes the devices 101, 103, 105, and 107. The device 107 is shared between the cluster 112 and the cluster 114. In some examples, there may be only one cluster or multiple clusters in a NAN network. Furthermore, there can be two clusters without a shared wireless device. Services can be published and/or subscribed within the cluster 112 or the cluster 114. The cluster 112 or the cluster 114 can be automatically created by the wireless devices within each cluster that cooperate to synchronize to a common discovery window schedule. Wireless devices participating in the cluster can exchange service frames describing or requesting a service. The cluster 112 or the cluster 114 can be identified by a NAN cluster identifier. Within the cluster 112, the wireless devices 101, 103, 105, and 107 can operate under different roles with different responsibilities: anchor/non-anchor, primary/secondary, or control/non-control. A master device can be referred to as an anchor device, or an anchor master device. A wireless device of the cluster 112 or the cluster 114 can become a master device at different times, based on a NAN master selection procedure. The wireless devices 101-107 can perform multicast or unicast communications with the peer wireless devices.

According to some aspects, a first data path 121 can be set up between the wireless device 101 and the wireless device 103. The first data path 121 can transmit data packets between the wireless device 101 and the wireless device 103. The first data path 121 can have a data path identifier. The wireless device 101 and the wireless device 103 can establish a service data session, during which the two devices can set up the first data path 121. The first data path 121 can be set up by a unicast service and/or a multicast service, following a negotiation procedure between the wireless device 101 and the wireless device 103.

According to some aspects, the wireless device 101 can be a subscriber device that includes a first application 111. The wireless device 103 can be a publisher device that includes a second application 131, which can provide a service to the first application 111. Hence, the wireless device 101 can be referred to as the subscriber device 101, and the wireless device 103 can be referred to as the publisher device 103. The service can be provided through the first data path 121 by the second application 131 that operates on the publisher device 103 to the first application 111 that operates on the subscriber device 101. The provided service can be identified by a first identifier 141 to identify the first application 111 for the service provided through the first data path 121, and a second identifier 143 to identify the second application 131 for the service provided through the first data path 121. In some example, the first identifier 141 or the second identifier 143 can be a universally unique identifier (UUID) including a 128-bit number. In more detail, the service is provided using an interface address, a NAN Data Interface (NDI) address, and an Internet Protocol (IP) address over the first data path with the first data path identifier.

According to some aspects, the first data path 121 can be interrupted for various reasons. When the data path is interrupted, embodiments herein provide mechanisms to enable the service to be provided without interruption by the first application to the second application over a new data path. The subscriber device 101 includes a recovery manager 142, and the publisher device 103 includes a recovery manager 144. The two recovery managers work together to establish a second data path 145 to replace the interrupted first data path 121. The data generated by the second application 131 to be provided to the first application 111 can be saved in a storage device (e.g., memory) of the publisher device 103 before the second data path 145 is established between the two devices. More details of the operations performed by the recovery manager 142 and the recovery manager 144 are illustrated in FIGS. 2-5.

According to some aspects, as shown in FIG. 1B, a wireless device 130 can include various hardware component and software components to support the operations described herein. The wireless device 130 can be the subscriber device 101, or the publisher device 103, or any other wireless devices 102, 104-107 as shown in FIG. 1A. For example, the wireless device wireless device 130 can implement the subscriber device 101 including a transceiver 132 configured to wirelessly communicate with the publisher device 103, a wireless controller 123 communicatively coupled to the transceiver 132 to manage communications between the publisher device 103 and the subscriber device 101. Similarly, the wireless device 130 can implement the publisher device 103 including the transceiver 132 configured to wirelessly communicate with the subscriber device 101. In addition, the wireless device 130 can include a processor 122, an operating system 133, a memory 135, or other components, communicatively coupled to each other.

In addition, the wireless device 130 can include a WLAN physical (PHY) layer 124, and a NAN driver 120. The WLAN PHY layer 124 can be a PHY layer for IEEE 802.11 standard, or any other WLAN standards. In detail, the NAN driver 120 can include a recovery manager 129, a medium access control (MAC) layer 125, and a discovery engine (DE) 126. The recovery manager 129 can implement the functions of the recovery manager 142 or the recovery manager 144 shown in FIG. 1A. In some examples, the recovery manager 129 can include a processor 151 and software operated on the processor 151 to implement the functions of the recovery manager 129. In some other examples, the recovery manager 129 can be implemented by hardware, e.g., an application specific integrated circuit (ASIC). The MAC layer 125 is responsible for the maintenance of NAN clusters (creating, joining or merging clusters), for preserving synchronization in the NAN cluster, and for providing transmit and receive services to the DE 126. The DE 126 provides publish/subscribe mechanisms to upper-layer services or applications, e.g., an application 127, and an application 128. When the wireless device 130 implements the subscriber device 101, the application 127 or the application 128 can be the first application 111. When the wireless device 130 implements the publisher device 103, the application 127 or the application 128 can be the second application 131. The application 127 or the application 128 can be operated by the processor 122. The components shown in FIG. 1B for the wireless device 130 is only for examples, and are not limiting. There can be other components, e.g., a digital signal processor (DSP), one or more processor cores, a multiple-core processor, an application-specific integrated circuit (ASIC), or any other suitable multi-purpose or specific processor or controller.

According to some aspects, the wireless the recovery manager 129 can perform operations for a subscriber device or a publisher device. More details of such operations are illustrated in FIGS. 2-3.

Figure 2:
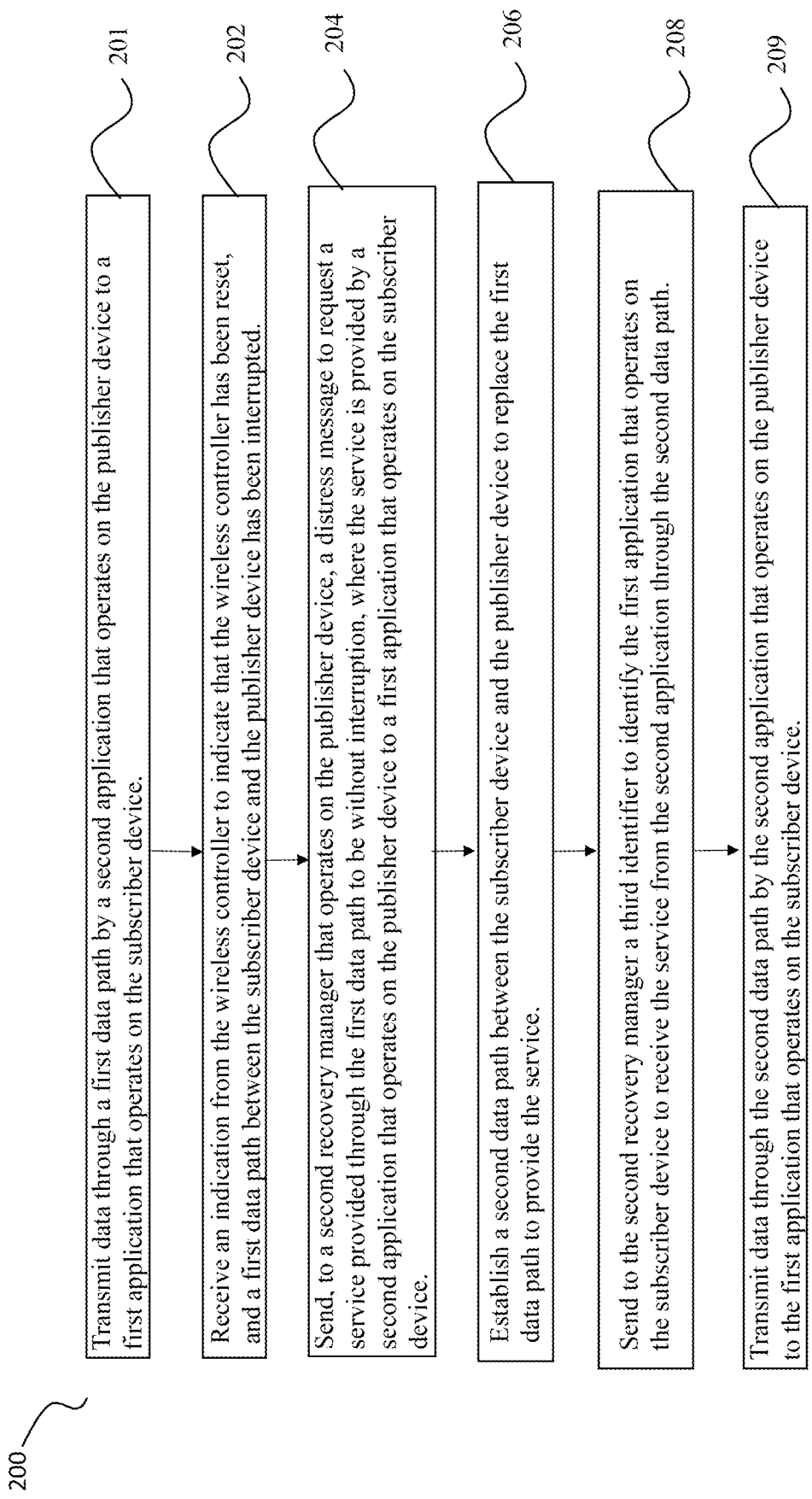
FIGS. 2-3 illustrate example operations performed by the recovery managers implemented in wireless devices of a NAN, according to some aspects of the disclosure.
Figure 3:
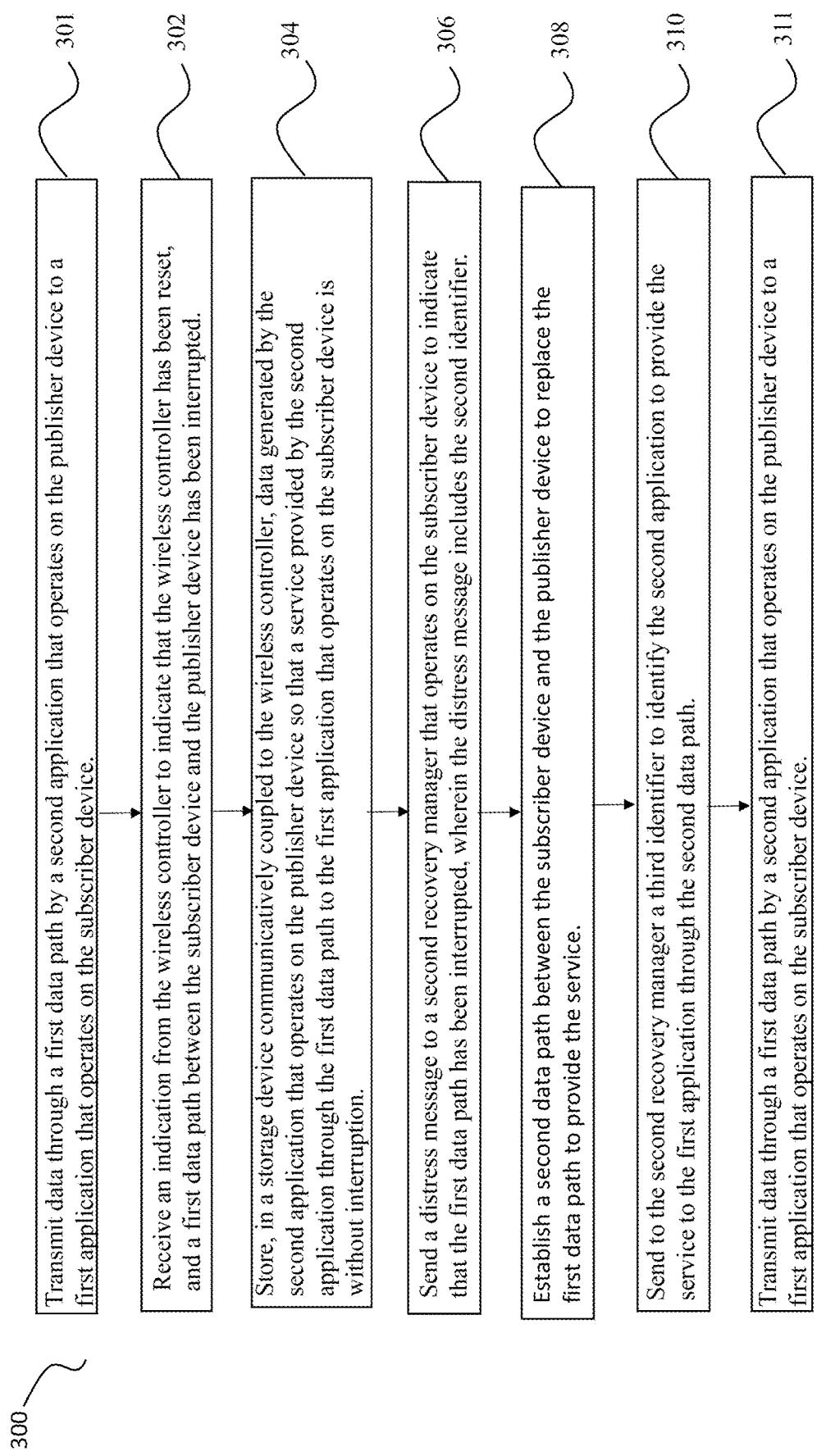

According to some aspects, FIG. 2 illustrates the operations of a method 200 performed by the recovery manager 129 when the wireless device 130 implements a subscriber device such as the subscriber device 101, and the recovery manager 129 implements the functions of the recovery manager 142 as shown in FIG. 1A.

At 201, the second application 131 that operates on the publisher device 103 transmits data through the first data path 121 to the first application 111 that operates on the subscriber device 101.

At 202, the recovery manager 129 receives an indication from the wireless controller 123 that the wireless controller 123 has been reset, and the first data path 121 between the subscriber device 101 and the publisher device 103 has been interrupted.

At 204, the recovery manager 129 sends, to the recovery manager 144 that operates on the publisher device 103, a distress message to request the service provided through the first data path 121 to be without interruption, and the first data path 121 between the subscriber device 101 and the publisher device 103 has been interrupted. The service is provided by the second application 131 that operates on the publisher device 103 to the first application 111 that operates on the subscriber device 101. The service provided through the first data path 121 is identified by the first identifier 141 to identify the first application 111, and the second identifier 143 to identify the second application 131. The distress message includes the first identifier 141.

At 206, the recovery manager 129 establishes the second data path 145 between the subscriber device 101 and the publisher device 103 to replace the first data path 121 to provide the service. In some examples, the second data path 145 has a second data path identifier that is the same as the first data path identifier of the first data path 121.

At 208, the recovery manager 129 sends to the recovery manager 144 a third identifier to identify the first application 111 that operates on the subscriber device 101 to receive the service from the second application 131 through the second data path 145.

At 209, the second application 131 that operates on the publisher device 103 transmits data through the second data path 145 to the first application 111 that operates on the subscriber device 101.

According to some aspects, the recovery manager 129 can perform more operations for the subscriber device 101, which are not shown in FIG. 2. For example, the recovery manager 129 can subscribe the first application 111 to receive the service provided by the second application 131, and initiate the second data path 145 before establishing the second data path 145 between the subscriber device 101 and the publisher device 103.

According to some aspects, FIG. 3 illustrates the operations of a method 300 performed by the recovery manager 129 when the wireless device 130 implements a publisher device such as the publisher device 103, and the recovery manager 129 implements the functions of the recovery manager 144 as shown in FIG. 1A.

At 301, the second application 131 that operates on the publisher device 103 transmits data through the first data path 121 to the first application 111 that operates on the subscriber device 101.

At 302, the recovery manager 129 receives an indication from the wireless controller 123 that the wireless controller 123 has been reset, and the first data path 121 between the subscriber device 101 and the publisher device 103 has been interrupted.

At 304, the recovery manager 129 stores, in the memory 135 communicatively coupled to the wireless controller 123, data generated by the second application 131 that operates on the publisher device 103 so that a service provided by the second application 131 through the first data path 121 to the first application 111 that operates on the subscriber device 101 is without interruption. The service provided through the first data path 121 is identified by the first identifier 142 to identify the first application 111, and the second identifier 144 to identify the second application 131.

At 306, the recovery manager 129 sends a distress message to the recovery manager 142 that operates on the subscriber device 101 to indicate that the first data path 121 has been interrupted, where the distress message includes the second identifier 144.

At 308, the recovery manager 129 establishes the second data path 145 between the subscriber device 101 and the publisher device 103 to replace the first data path 121 to provide the service.

At 310, the recovery manager 129 sends to the recovery manager 142 a third identifier to identify the second application 131 to provide the service to the first application 111 through the second data path 145.

At 311, the second application 131 that operates on the publisher device 103 transmits data through the second data path 145 to the first application 111 that operates on the subscriber device 101.

According to some aspects, the recovery manager 129 can perform more operations for the publisher device 103, which are not shown in FIG. 3. For example, the recovery manager 129 can publish the service provided by the second application 131 that operates on the publisher device 103, and sends, through the second data path 145, data stored in the memory 135 and generated by the second application 131. The data is generated by the second application 131 during a time period from a time instance when the wireless controller 123 has been reset to a time instance when the subscriber device 101 has received the third identifier to identify the second application 131 to provide the service through the second data path 145.

Figure 4:
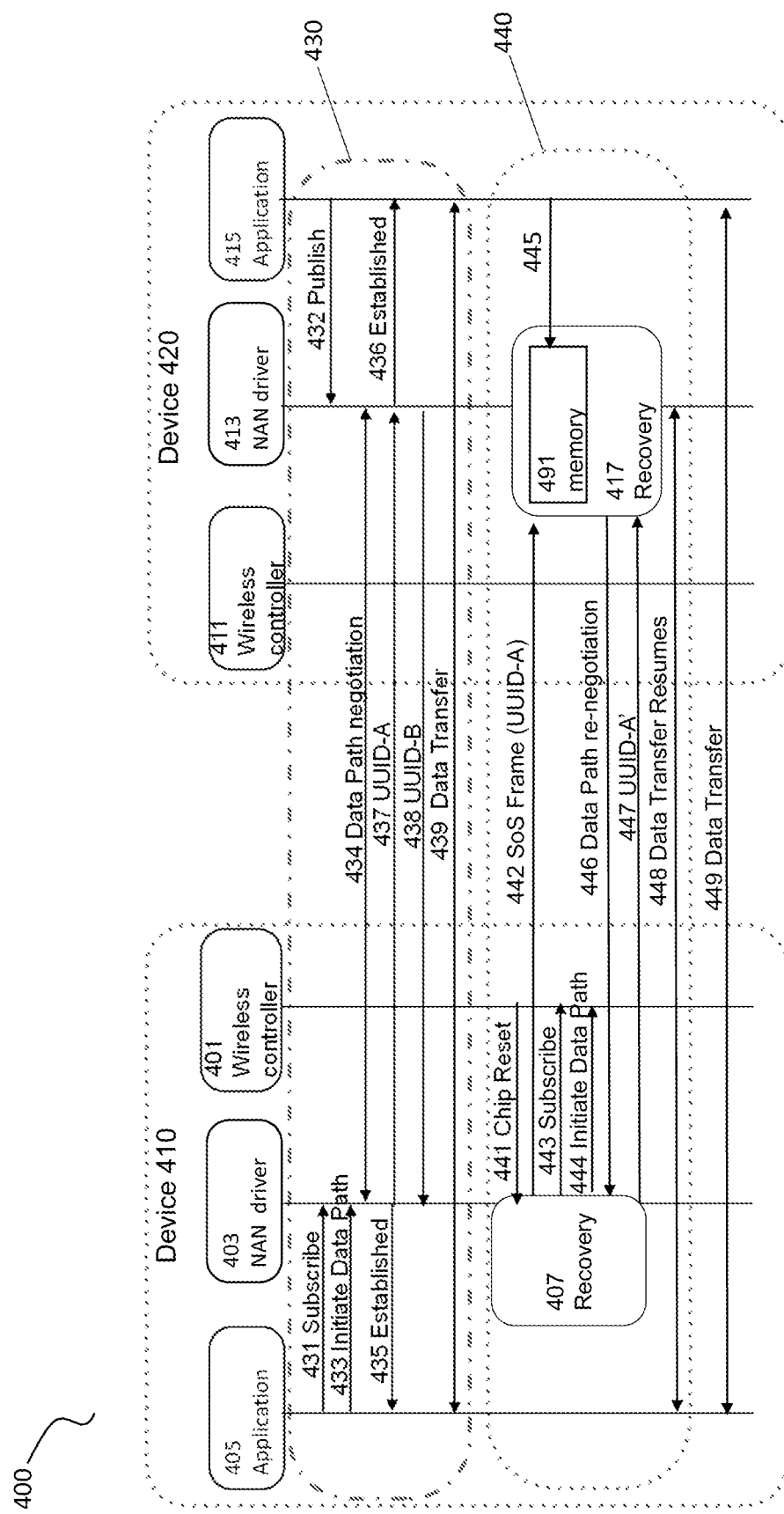
FIGS. 4-5 illustrates example methods performed by recovery managers for providing a service without interruption between two devices of a NAN when a data path between the two devices has been interrupted, according to some aspects of the disclosure.

FIG. 4 illustrates an example method 400 performed by recovery managers, e.g., a recovery manager 407 and a recovery manager 417, for providing a service without interruption between two devices, e.g., a device 410 and a device 420, of a NAN when a data path between the two devices has been interrupted, according to some aspects of the disclosure. As a convenience and not a limitation, FIG. 4 can be described with regard to elements of FIGS. 1A, 1B, 2, 3, 6, and 7. For example, the device 410 and the device 420 can be examples of the device 101 and the device 103, respectively. The method 400 may represent the operations of the subscriber device 101 and the publisher device 103. The method 400 may also be performed by the system 600 of FIG. 6 and/or the computer system 700 of FIG. 7. But the method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

According to some aspects, a subscriber device 410 includes a first application 405, a recovery manager 407, a NAN driver 403, and a wireless controller 401. A publisher device 420 includes a second application 415, a NAN driver 413, a recovery manager 417, a memory 491, and a wireless controller 411. The second application 415 provides a service to the first application 405. For example, a service provided can include, a friend finder using which we can be notified if our friend is in nearby vicinity in any public space. In another example, ad-hoc gaming can be done. If a user wants to play a multiplayer game, the user can look for people with similar interest. The user can use his/her device as the publisher device 420, and other users can use other devices as subscriber device 410. The method 400 includes two parts of operations, operations 430 and operations 440. The operations 430 include operations to establish a first data path between the subscriber device 410 and the publisher device 420, while the second application 415 provides a service to the first application 405 over the first data path. The operations 440 includes operations to enable the service to be provided without interruption by the second application 415 to the first application 405 over a second data path when the first data path has been interrupted.

At 431, the first application 405 communicates to the NAN driver 403 to subscribe to the service. At 432, the second application 415 communicates to the NAN driver 413 to publish the service. At 433, the first application 405 communicates to the NAN driver 403 to initiate a first data path. At 434, the NAN driver 403 and the NAN driver 413 negotiate to establish the first data path between the subscriber device 410 and the publisher device 420. At 435 and at 436, the service between the first application 405 and the second application 415 is established. At 437, the NAN driver 403 sends to the NAN driver 413 a first identifier to identify the first application 405 for the service over the first data path. At 438, the NAN driver 413 sends to the NAN driver 403 a second identifier to identify the second application 415 for the service over the first data path. At 439, data is transmitted from the second application 415 to the first application 405 over the first data path.

At 441, the recovery manager 407 receives an indication from the wireless controller 401 to indicate that the wireless controller 401 has been reset, and the first data path between the subscriber device 410 and the publisher device 420 has been interrupted.

At 442, the recovery manager 407 sends, to the recovery manager 417 a distress message to request the service provided through the first data path to be without interruption. The service is provided by the second application 415 to the first application 405. The distress message includes the first identifier to identify the first application 405.

The recovery manager 417 receives, from the recovery manager 407, the distress message to indicate that the first data path has been interrupted, where the distress message includes the first identifier to identify the first application 405. In addition, the recovery manager 417 validates the first application 405 based on the first identifier received in the distress message. Furthermore, at 445, the recovery manager 417 stores, in the memory 491, data generated by the second application 415 so that the service provided by the second application 415 is without interruption. In some example, the second application 415 is not aware of the interruption to the first data path, and provides the service as if there was interruption. In some other examples, the second application 415 can be made aware of the interruption to the first data path, and continue to provide the service.

At 443, the recovery manager 407 subscribes the first application 405 to receive the service provided by the second application 415. At 444, the recovery manager 407 initiates a second data path to be established between the subscriber device 410 and the publisher device 420.

At 446, the recovery manager 407 and the recovery manager 417 work together to establish a second data path between the subscriber device 410 and the publisher device 420 to replace the first data path to provide the service. In some examples, there can be multiple rounds of message exchanges between the subscriber device 410 and the publisher device 420 to establish the second data path as will be understood by those skilled in the art.

At 447, the recovery manager 407 sends to the recovery manager 417 a third identifier to identify the first application 405 to receive the service from the second application 415 through the second data path.

At 448, the recovery manager 417 sends, through the second data path, data stored in the memory 491, and the first application 405 receives data from the recovery manager 417. The stored data is generated by the second application 415 during a time period from a time instance when the wireless controller 401 has been reset to a time instance when the publisher device 420 has received the third identifier to identify the first application 405 to receive the service through the second data path. Hence, little or no data for the service provided by the second application 415 is lost during the time period the second data path is established to replace the first data path.

At 449, the second application 415 further provides data through the second data path to the first application 405, and the first application 405 further receives data through the second data path from the second application 415. The data is generated by the second application 415 to continue to provide the service after the publisher device 420 has received the third identifier.

Figure 5:
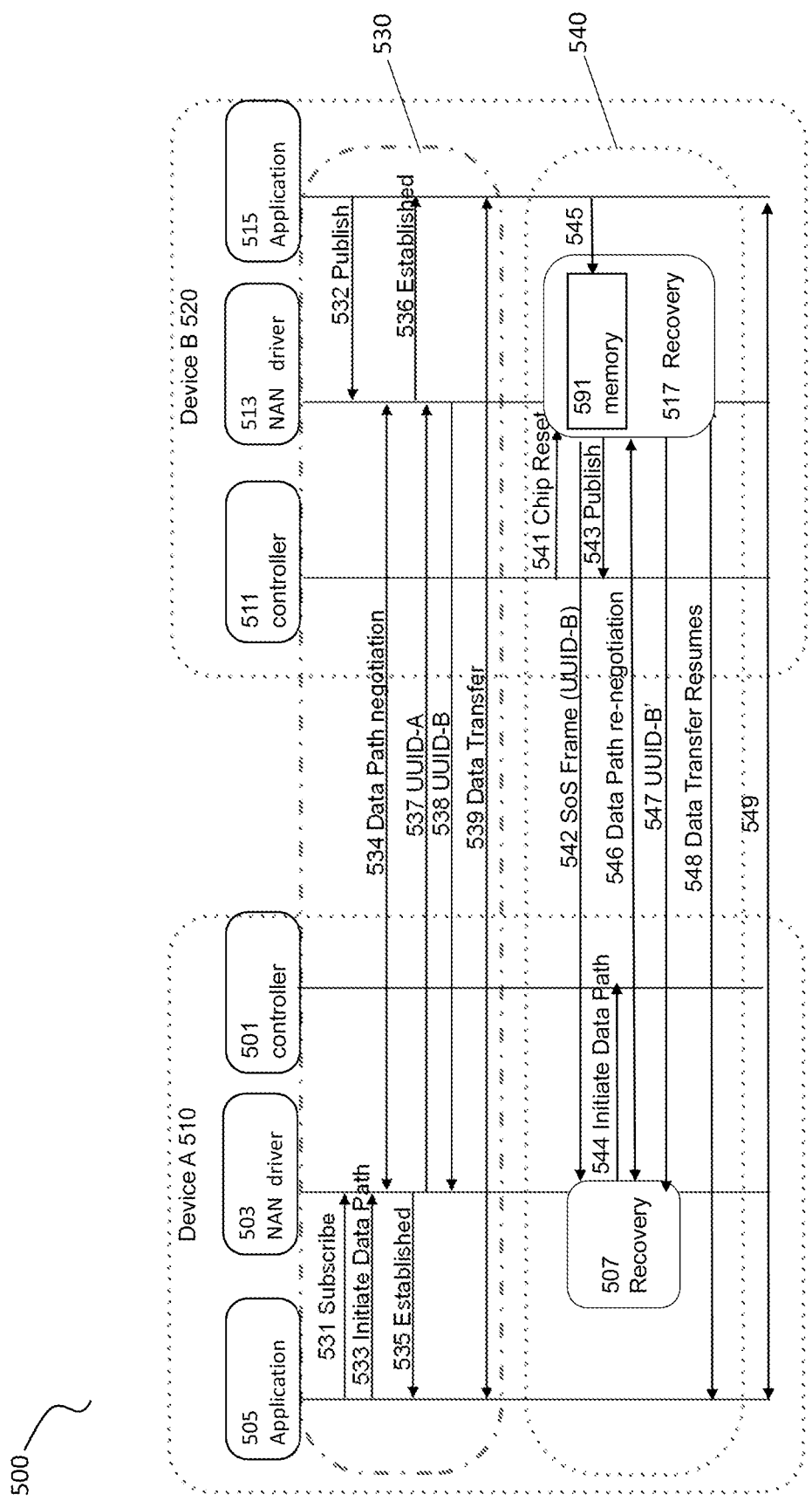

FIG. 5 illustrates an example method 500 performed by recovery managers, e.g., a recovery manager 507 and a recovery manager 517, for providing a service without interruption between two devices, e.g., a device 510 and a device 520, of a NAN when a data path between the two devices has been interrupted, according to some aspects of the disclosure. As a convenience and not a limitation, FIG. 5 can be described with regard to elements of FIGS. 1A, 1B, 2, 3, 6, and 7. For example, the device 510 and the device 520 can be examples of the device 101 and the device 103, respectively. The method 500 may represent the operations of the subscriber device 101 and the publisher device 103. The method 500 may also be performed by the system 600 of FIG. 6 and/or the computer system 700 of FIG. 7. But the method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

According to some aspects, a subscriber device 510 includes a first application 505, a recovery manager 507, a NAN driver 503, and a wireless controller 501. A publisher device 520 includes a second application 515, a NAN driver 513, a recovery manager 517, a memory 591, and a wireless controller 511. The second application 515 provides a service to the first application 505. The method 500 includes two parts of operations, operations 530 and operations 540. The operations 530 include operations to establish a first data path between the subscriber device 510 and the publisher device 520, while the second application 515 provides a service to the first application 505 over the first data path. The operations 540 includes operations to enable the service to be provided without interruption by the second application 515 to the first application 505 over a second data path when the first data path has been interrupted.

At 531, the first application 505 communicates to the NAN driver 503 to subscribe the service. At 532, the second application 515 communicates to the NAN driver 513 to publish the service. At 533, the first application 505 communicates to the NAN driver 503 to initiate a first data path. At 534, the NAN driver 503 and the NAN driver 513 negotiate to establish the first data path between the subscriber device 510 and the publisher device 520. At 535 and at 536, the service between the first application 505 and the second application 515 is established. At 537, the NAN driver 503 sends to the NAN driver 513 a first identifier to identify the first application 505 for the service over the first data path. At 538, the NAN driver 513 sends to the NAN driver 503 a second identifier to identify the second application 515 for the service over the first data path. At 539, data is transmitted from the second application 515 to the first application 505 over the first data path.

At 541, the recovery manager 517 receives an indication from the wireless controller 511 to indicate that the wireless controller 511 has been reset, and the first data path between the subscriber device 510 and the publisher device 520 has been interrupted.

At 542, the recovery manager 517 sends, to the recovery manager 507, a distress message to request a service provided through the first data path to be without interruption. The service is provided by the second application 515 to the first application 505. The distress message includes the second identifier to identify the second application 515. Furthermore, at 545, the recovery manager 517 stores, in the memory 591, data generated by the second application 515 so that the service provided by the second application 515 is without interruption and data would not be lost during the process of recovering the service. In some example, the second application 515 is not aware of the interruption to the first data path, and provides the service as if there was no interruption. In some other examples, the second application 515 can be made aware of the interruption to the first data path, and continue to provide the service.

The recovery manager 507 receives, from the recovery manager 517, the distress message to indicate that the first data path has been interrupted, where the distress message includes the second identifier to identify the second application 515. In addition, the recovery manager 507 validates the second application 515 based on the second identifier received in the distress message.

At 543, the recovery manager 517 communicates with the wireless controller 511 to publish the service provided by the second application 515. At 544, the recovery manager 507 initiates a second data path to be established between the subscriber device 510 and the publisher device 520.

At 546, the recovery manager 507 and the recovery manager 517 work together to establish a second data path between the subscriber device 510 and the publisher device 520 to replace the first data path to provide the service. In some examples, there can be multiple rounds of message exchanges between the subscriber device 510 and the publisher device 520 to establish the second data path as will be understood by those skilled in the art.

At 547, the recovery manager 517 sends to the recovery manager 507 a third identifier to identify second application 515 to provide the service to the first application 505 through the second data path. The recovery manager 507 receives the third identifier from the recovery manager 517.

At 548, the recovery manager 517 sends, through the second data path, data stored in the memory 591, and the first application 505 receives data from the recovery manager 517. The stored data is generated by the second application 515 during a time period from a time instance when the wireless controller 511 has been reset to a time instance when the subscriber device 510 has received the third identifier to identify the second application 515 to provide the service through the second data path. Hence, little or no data for the service provided by the second application 515 is lost during the time period the second data path is established to replace the first data path.

At 549, the second application 515 further provides data through the second data path to the first application 505, and the first application 505 further receives data through the second data path from the second application 515. The data is generated by the second application 515 to continue to provide the service after the publisher device 520 has received the third identifier.

Figure 6:
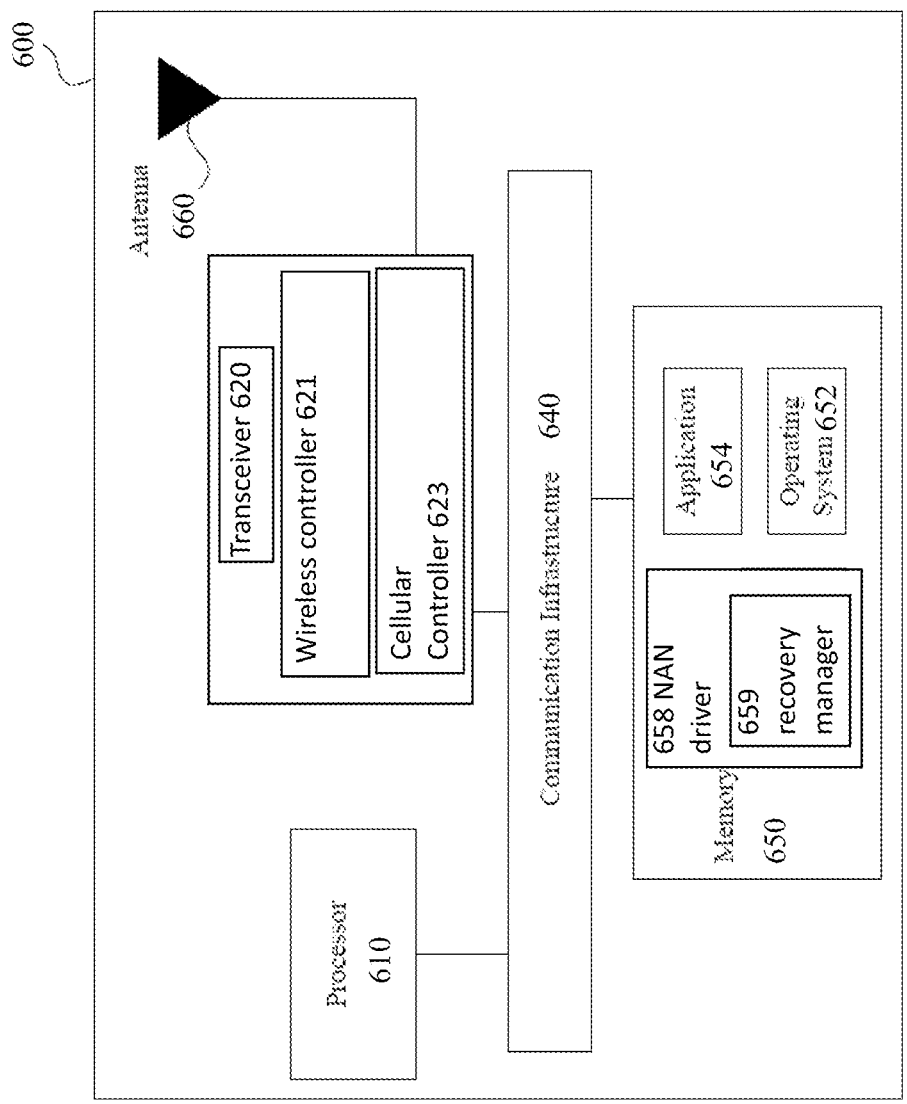
FIG. 6 illustrates a block diagram of an example system of an electronic device implementing designs for recovery managers to provide a service without interruption between two devices, according to some aspects of the disclosure.

FIG. 6 illustrates a block diagram of an example system 600 of an electronic device implementing designs for recovery managers to provide a service without interruption between two devices, according to some aspects of the disclosure. System 600 may be any of the electronic devices (e.g., the wireless devices 101-107) of the NAN 100 as shown in FIG. 1A, the wireless device 130 as shown in FIG. 1B, the wireless device 410 and the wireless device 420 as shown in FIG. 4, and the wireless device 510 and the wireless device 520 as shown in FIG. 5. The system 600 includes a processor 610, one or more transceivers 620, communication infrastructure 640, a memory 650, an operating system 652, a NAN driver 658 containing a recovery manager 659, a wireless controller 621, a cellular controller 623, an application 654, and one or more antenna 660. The wireless controller 621, the NAN driver 658, the recovery manager 659, and the application 654, are examples of the wireless controller 123, the NAN driver 120, the recovery manager 129, and the application 127, as shown in FIG. 1B, the wireless controller 401, the NAN driver 403, the recovery manager 407, and the application 405, the wireless controller 411, the NAN driver 413, the recovery manager 417, and the application 415, as shown in FIG. 4, the wireless controller 501, the NAN driver 503, the recovery manager 507, and the application 505, the wireless controller 511, the NAN driver 513, the recovery manager 517, and the application 515, as shown in FIG. 5. Illustrated systems are provided as exemplary parts of system 600, and system 600 can include other circuit(s) and subsystem(s). Also, although the systems of system 600 are illustrated as separate components, the aspects of this disclosure can include any combination of these, less, or more components.

The NAN driver 658, including the recovery manager 659, can be implemented by the processor 610 executing instructions stored in the memory 650 that define the respective NAN functions including the various recovery manager functions described herein. Alternatively, the NAN driver 658 including the recovery manager 659 can be implemented on a separate processor or state-machine (not shown) that is "hard-wired" to implement the NAN functions including the various recovery manager functions described herein.

Memory 650 may include random access memory (RAM) and/or cache, and may include control logic (e.g., computer software) and/or data. Memory 650 may include other storage devices or memory such as, but not limited to, a hard disk drive and/or a removable storage device/unit. According to some examples, operating system 652 can be stored in memory 650. Operating system 652 can manage transfer of data from memory 650 and/or one or more applications 654 to processor 610 and/or one or more transceivers 620. In some examples, operating system 652 maintains one or more network protocol stacks (e.g., Internet protocol stack, cellular protocol stack, and the like) that can include a number of logical layers. At corresponding layers of the protocol stack, operating system 652 includes control mechanism and data structures to perform the functions associated with that layer.

According to some examples, application 654 can be stored in memory 650. Application 654 can include applications (e.g., user applications) used by wireless system 600 and/or a user of wireless system 600. The applications in application 654 can include applications such as, but not limited to, Siri™, FaceTime™, radio streaming, video streaming, remote control, and/or other user applications.

System 600 can also include communication infrastructure 640. Communication infrastructure 640 provides communication between, for example, processor 610, one or more transceivers 620, and memory 650. In some implementations, communication infrastructure 640 may be a bus. Processor 610 together with instructions stored in memory 650 performs operations enabling system 600 to implement mechanisms for recovery managers to provide a service without interruption between two devices, as described herein for the NAN network 100 as shown in FIG. 1A, the method 200, the method 300, the method 400, or the method 500 as shown in FIGS. 2-5.

One or more transceivers 620 transmit and receive communications signals that support mechanisms for recovery managers to provide a service without interruption between two devices, as described herein for the NAN network 100 as shown in FIG. 1A, the method 200, the method 300, the method 400, or the method 500 as shown in FIGS. 2-5. Additionally, one or more transceivers 620 transmit and receive communications signals that support mechanisms for recovery managers to provide a service without interruption between two devices, as described herein for the NAN network 100 as shown in FIG. 1A, the method 200, the method 300, the method 400, or the method 500 as shown in FIGS. 2-5. According to some aspects, one or more transceivers 620 may be coupled to antenna 660. Antenna 660 may include one or more antennas that may be the same or different types. One or more transceivers 620 allow system 600 to communicate with other devices that may be wired and/or wireless. In some examples, one or more transceivers 620 can include processors, controllers, radios, sockets, plugs, buffers, and like circuits/devices used for connecting to and communication on networks. According to some examples, one or more transceivers 620 include one or more circuits to connect to and communicate on wired and/or wireless networks.

According to some aspects of this disclosure, one or more transceivers 620 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 620 can include more or fewer systems for communicating with other devices.

In some examples, one or more transceivers 620 can include one or more circuits (including a WLAN transceiver) to enable connection(s) and communication over WLAN networks such as, but not limited to, networks based on standards described in IEEE 802.11.

Additionally, or alternatively, one or more transceivers 620 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 620 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, processor 610, alone or in combination with computer instructions stored within memory 650, and/or one or more transceiver 620, implements the methods and mechanisms discussed in this disclosure. For example, processor 610, alone or in combination with computer instructions stored within memory 650, and/or one or more transceiver 620, implements mechanisms for recovery managers (e.g., 659) to provide a service without interruption between two devices. According to some aspects of this disclosure, processor 610, alone or in combination with computer instructions stored within memory 650, and/or one or more transceiver 620, can implement operations performed by the NAN driver 658 in the NAN network 100 as shown in FIG. 1A, the method 200, the method 300, the method 400, or the method 500 as shown in FIGS. 2-5.

Figure 7:
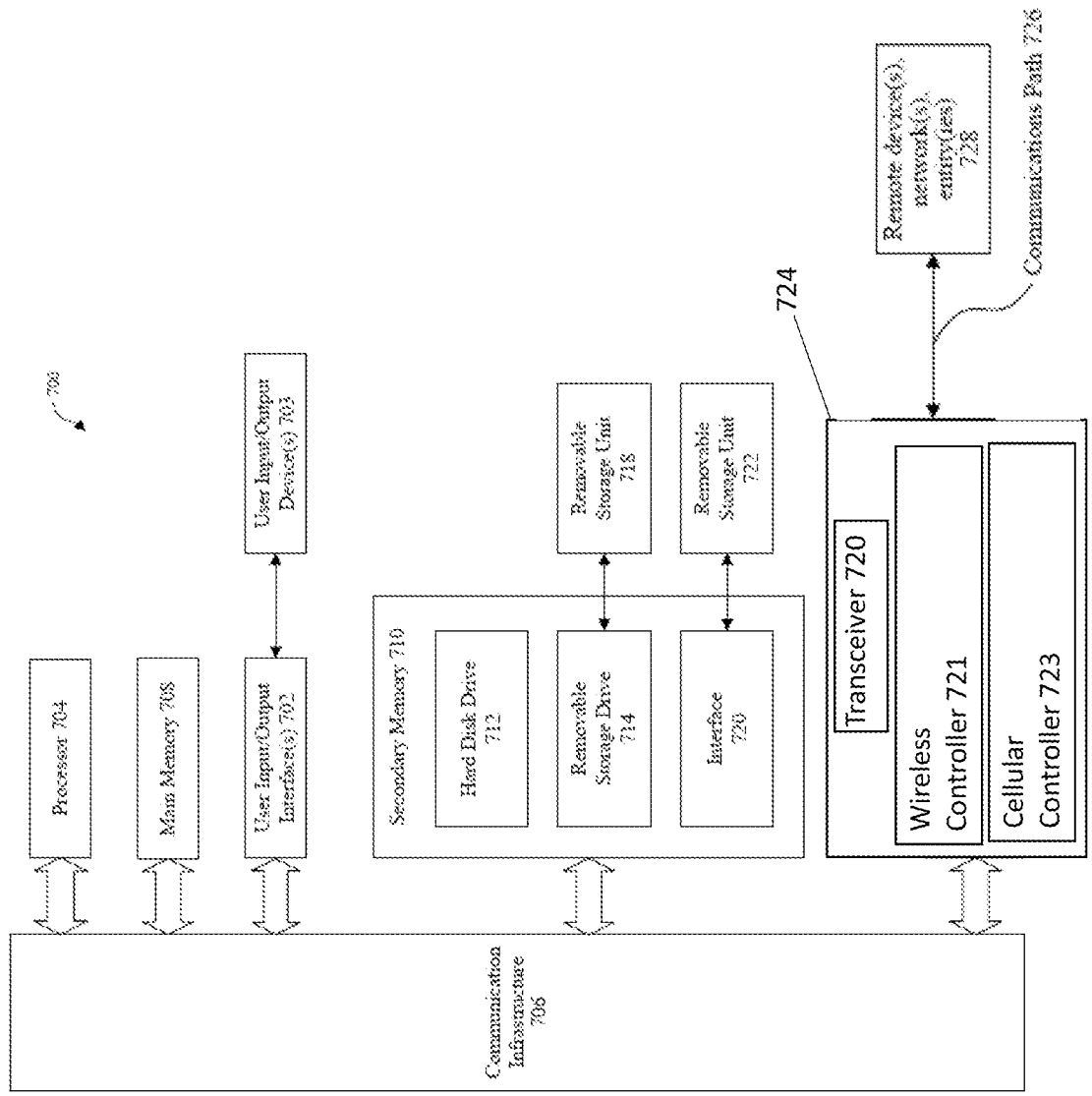
FIG. 7 is an example computer system for implementing some aspects or portion(s) thereof of the disclosure provided herein.

Various aspects can be implemented, for example, using one or more computer systems, such as computer system 700 shown in FIG. 7. Computer system 700 can be any computer capable of performing the functions described herein such as the wireless devices 101-107 of the NAN 100 as shown in FIG. 1A, the wireless device 130 as shown in FIG. 1B, the wireless device 410 and the wireless device 420 as shown in FIG. 4, and the wireless device 510 and the wireless device 520 as shown in FIG. 5, or 600 of FIG. 6. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a wireless device, e.g., the wireless devices 101-107 of the NAN 100 as shown in FIG. 1A, the wireless device 130 as shown in FIG. 1B, the wireless device 410 and the wireless device 420 as shown in FIG. 4, and the wireless device 510 and the wireless device 520 as shown in FIG. 5, or device 600 of FIG. 6. In some examples, the operations include receiving an indication from the wireless controller to indicate that the wireless controller has been reset, and a first data path between the subscriber device and the publisher device has been interrupted; sending, to a second recovery manager that operates on the publisher device, a distress message to request a service provided through the first data path to be without interruption, wherein the service is provided by a second application that operates on the publisher device to a first application that operates on the subscriber device, wherein the service provided through the first data path is identified by a first identifier to identify the first application, and a second identifier to identify the second application, and wherein the distress message includes the first identifier; establishing a second data path between the subscriber device and the publisher device to replace the first data path to provide the service; and sending to the second recovery manager a third identifier to identify the first application that operates on the subscriber device to receive the service from the second application through the second data path.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726. Operations of the communication interface 724 can be performed by a wireless controller 721, and/or a cellular controller 723. In some examples, the wireless controller 721 can be an example of the wireless controller 123 as shown in FIG. 1B, the wireless controller 401, the wireless controller 411, the wireless controller 501, or the wireless controller 511, as shown in FIGS. 4-5. The cellular controller 723 can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

What is claimed is:

1. A neighbor awareness networking (NAN) subscriber device, comprising:
a transceiver configured to wirelessly communicate with a publisher device using a NAN protocol;
a wireless controller communicatively coupled to the transceiver and configured to manage communications between the publisher device and the NAN subscriber device; and
a first recovery manager operated in connection with the wireless controller, configured to:
receive an indication that the wireless controller has been reset and that a first data path between the NAN subscriber device and the publisher device has been interrupted;
send, to a second recovery manager that operates on the publisher device, a distress message to request a service provided through the first data path be uninterrupted, wherein the service is provided by a second application that operates on the publisher device to a first application that operates on the NAN subscriber device, wherein the service provided through the first data path is identified by a first identifier to identify the first application and a second identifier to identify the second application, and wherein the distress message includes the first identifier;
establish a second data path between the NAN subscriber device and the publisher device to replace the first data path for providing the service; and
send to the second recovery manager a third identifier identifying the first application that operates on the NAN subscriber device to receive the service from the second application through the second data path.

2. The NAN subscriber device of claim 1, wherein the first application is configured to receive data from the second application through the second data path, wherein the data is stored by the second recovery manager from a time instance when the wireless controller has been reset to a time instance when the publisher device has received the third identifier identifying the first application that operates on the NAN subscriber device to receive the service through the second data path.

3. The NAN subscriber device of claim 2, wherein the first application further receives the data through the second data path, wherein the data is generated by the second application to continue providing the service after the publisher device has received the third identifier.

4. The NAN subscriber device of claim 2, wherein the service is provided by the second application through the second data path using an interface address, a NAN Data Interface (NDI) address, and an Internet Protocol (IP) address that have been used by the service provided through the first data path.

5. The NAN subscriber device of claim 2, further comprising:
a processor communicatively coupled to the transceiver and the wireless controller that executes the first application and the first recovery manager.

6. The NAN subscriber device of claim 1, wherein the first recovery manager is further configured to:
subscribe to the first application to receive the service provided by the second application; and
initiate the second data path before establishing the second data path between the NAN subscriber device and the publisher device.

7. The NAN subscriber device of claim 1, wherein the first data path has a first data path identifier that is the same as a second data path identifier of the second data path.

8. The NAN subscriber device of claim 1, wherein the first identifier identifying the first application for the service provided through the first data path, the second identifier identifying the second application for the service provided through the first data path, or the third identifier identifying the first application for the service provided through the second data path is a universally unique identifier (UUID) comprising a 128-bit number.

9. The NAN subscriber device of claim 1, wherein the distress message is a first distress message, and the first recovery manager is further configured to:
- receive, from the second recovery manager that operates on the publisher device, a second distress message to indicate that the first data path between the NAN subscriber device and the publisher device has been interrupted, and request the service provided through the first data path be uninterrupted;
- initiate a third data path between the NAN subscriber device and the publisher device to replace the first data path for providing the service;
- establish the third data path between the NAN subscriber device and the publisher device to replace the first data path for providing the service; and
- receive from the publisher device a third identifier identifying the second application providing the service to the first application through the third data path.

10. The NAN subscriber device of claim 9, wherein the first application is configured to receive data through the third data path, wherein the data is stored by the second recovery manager from a time instance when the first data path has been interrupted to a time instance when the NAN subscriber device has received the third identifier identifying the second application providing the service through the third data path.

11. The NAN subscriber device of claim 10, wherein the first application is further configured to:
- receive the data through the third data path, wherein the data is generated by the second application after the NAN subscriber device has received the third identifier.

12. A neighbor awareness networking (NAN) publisher device, comprising:
- a transceiver configured to wirelessly communicate with a subscriber device using a NAN protocol;
- a wireless controller communicatively coupled to the transceiver and configured to manage communications between the NAN publisher device and the subscriber device; and
- a first recovery manager operated in connection with the wireless controller, and configured to:
  - receive an indication that the wireless controller has been reset and that a first data path between the subscriber device and the NAN publisher device has been interrupted;
  - store, in a memory communicatively coupled to the wireless controller, data generated by a first application that operates on the NAN publisher device so that a service provided by the first application through the first data path to a second application that operates on the subscriber device is uninterrupted, and wherein the service provided through the first data path is identified by a first identifier to identify the first application, and a second identifier to identify the second application;
  - send a distress message to a second recovery manager that operates on the subscriber device to indicate that the first data path has been interrupted, wherein the distress message includes the first identifier;
  - establish a second data path between the subscriber device and the NAN publisher device to replace the first data path for providing the service; and
  - send to the second recovery manager a third identifier to identify the first application providing the service to the second application through the second data path.

13. The NAN publisher device of claim 12, wherein the first recovery manager is further configured to:
- publish the service provided by the first application.

14. The NAN publisher device of claim 12, wherein the first recovery manager is further configured to:
- send, through the second data path, the data stored in the memory and generated by the first application, wherein the data is generated by the first application from a time instance when the wireless controller has been reset to a time instance when the subscriber device has received the third identifier identifying the first application that provides the service through the second data path.

15. The NAN publisher device of claim 14, wherein the first application further provides the data through the second data path to the second application, wherein the data is generated by the first application to continue providing the service after the subscriber device has received the third identifier.

16. The NAN publisher device of claim 15, further comprising:
- a processor communicatively coupled to the transceiver and the wireless controller that executes the first application and the first recovery manager.

17. A neighbor awareness networking (NAN) publisher device, comprising:
- a transceiver configured to wirelessly communicate with a subscriber device using a NAN protocol;
- a wireless controller communicatively coupled to the transceiver and configured to manage communications between the NAN publisher device and the subscriber device; and
- a first recovery manager operated in connection with the wireless controller, and configured to:
  - receive, from a second recovery manager that operates on the subscriber device, a distress message to indicate that a first data path between the subscriber device and the NAN publisher device has been interrupted, and request a service provided through the first data path be uninterrupted, wherein the service is provided by a first application that operates on the NAN publisher device to a second application that operates on the subscriber device, wherein the service provided through the first data path is identified by a second identifier to identify the second application, and a first identifier to identify the first application, and wherein the distress message includes the second identifier;
  - store, in a memory communicatively coupled to the wireless controller, data generated by the first application so that the service provided by the first application is uninterrupted;
  - establish a second data path between the subscriber device and the NAN publisher device to replace the first data path for providing the service; and
  - receive from the subscriber device a third identifier identifying the second application to receive the service through the second data path.

18. The NAN publisher device of claim 17, wherein the first recovery manager is further configured to validate the second application based on the second identifier received in the distress message.

19. The NAN publisher device of claim 17, wherein the first recovery manager is further configured to:
- send, through the second data path, the data stored in the memory, wherein the data is generated by the first application from a time instance when the first data path has been interrupted to a time instance when the NAN publisher device has received the third identifier identifying the second application to receive the service through the second data path.

20. The NAN publisher device of claim 19, wherein the first application further provides the data through the second data path to the second application, wherein the data is generated by the first application to continue providing the service after the NAN publisher device has received the third identifier.

* * * * *